United States Patent [19]
Kaufman

[11] 3,858,618
[45] Jan. 7, 1975

[54] PIPING FOR FIRE PROTECTION SYSTEMS
[75] Inventor: John W. Kaufman, Tiburon, Calif.
[73] Assignee: Factory Mutual Research Corporation, Norwood, Mass.
[22] Filed: Jan. 10, 1973
[21] Appl. No.: 322,383

[52] U.S. Cl............... 138/149, 138/124, 138/148, 169/16
[51] Int. Cl........................ F16l 9/14, A62c 35/16
[58] Field of Search .......... 138/148, 123, 149, 125, 138/127, 118, 137, 110; 285/114, 149; 169/16-19

[56] References Cited
UNITED STATES PATENTS

| 359,222 | 3/1887 | Meacom | 138/127 |
|---|---|---|---|
| 1,630,895 | 5/1927 | Herbst | 138/127 X |
| 1,838,242 | 12/1931 | Wilson | 138/148 X |
| 2,193,036 | 3/1940 | McGraw | 138/127 X |
| 2,564,602 | 8/1951 | Hurst | 138/127 X |
| 2,787,289 | 4/1957 | Press | 138/DIG. 3 |
| 3,014,501 | 12/1961 | Jacobi | 138/137 X |
| 3,374,013 | 3/1968 | Clay et al. | 285/114 |

Primary Examiner—Richard C. Queisser
Assistant Examiner—Daniel M. Yasich
Attorney, Agent, or Firm—Lane, Aitken, Dienner & Ziems

[57] ABSTRACT

A piping in which a plastic tubular member is encased in wire mesh for use in fire sprinkler systems. The mesh substantially protects the tubular member from thermal deterioration. When deterioration does occur, it is generally in the form of pin holes which permit water to flow onto the mesh, cooling it, and preventing further heat transfer to the tubular member.

4 Claims, 2 Drawing Figures

PIPING FOR FIRE PROTECTION SYSTEMS

BACKGROUND OF THE INVENTION

This invention relates to piping for use in fire protection systems. In the art of automatic fire protection, a number of sprinkler installations are presently in use which utilize iron piping and fittings to connect the sprinkler heads with the water source. In order to reduce the cost of installation and to some degree the cost of materials for water supply piping, other means have been sought as a substitute for the iron piping. Plastic pipe and fittings, such as polyvinylchloride piping, have been developed and are in increasing use in many arts, but they have not been used in sprinkler systems since a reliable and economic method for protecting them against the heat of fires was unavailable.

SUMMARY OF THE INVENTION

It is therefore an object of the present invention to provide plastic piping which is resistant to thermal deterioration, or heat frustration.

It is therefore a further object of this invention to provide plastic piping for use in fire protection systems.

It is a still further object of the present invention to provide plastic piping having a protective wrapping for use in sprinkler systems which assists in disbursing water to aid in extinguishing a fire.

In accordance with the present invention the piping for use in fire protection systems consists of a plastic tubular member encased either loosely or tightly, in wire mesh. When installed in a sprinkler system and exposed to fire, the mesh will at least partially insulate the tubular member from the fire. If any failure of the tubular member does occur, it usually is in the form of small pin holes which permit the escaping water of the system to drip onto the screen thereby cooling it and preventing further transfer of heat to the tubular member. Where larger openings occur, the wire screen breaks up the water discharged from the openings into a spray and thus aids in extinguishing the fire.

DESCRIPTION OF THE PREFERRED EMBODIMENTS

Figure 1:
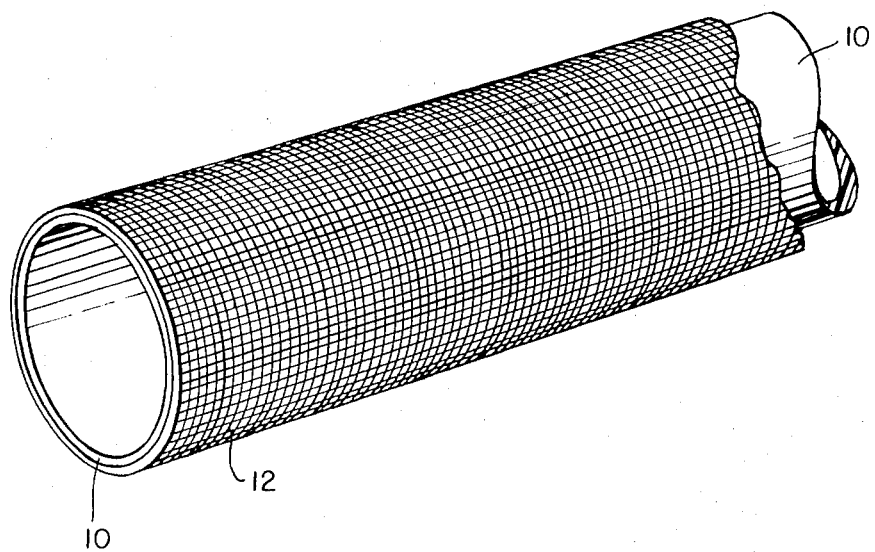
FIG. 1 is a perspective view of a section of plastic piping according to the present invention.

Referring to FIG. 1 of the drawings, the piping of the present invention consists of a tubular member 10 formed of a plastic material, and a screening material 12 extending over the tubular member 10.

The tubular member 10 may be manufactured by conventional extrusion methods, and in a preferred embodiment, the plastic material will be polyvinylchloride, although other polymers, such as polyester resins, epoxy resins, and polyurethanes produced from bromophenyl di-isocyanate, may be used. In some cases the flame resistance of the plastic composites may be enhanced by adding phosphate and halogen-containing plasticizers such as chlorinated paraffins or chlorinated polyphenol resins.

Figure 2:
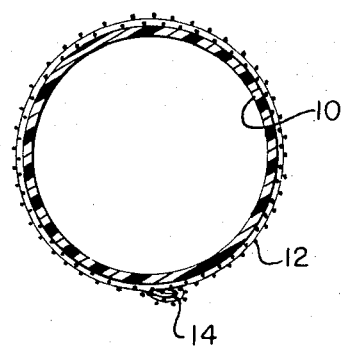
FIG. 2 is a cross-sectional view of the piping of FIG. 1.

The screening material 12 may be either woven wire or perforated sheet material, and in a preferred embodiment, will be aluminum mesh having a standard gauge number between 10 and 20. In manufacture the screening material 12 is wrapped around the plastic piping, and is fastened by any convenient means such as crimping as illustrated in FIG. 2 by the numeral 14, or by rivets, or the like.

The screen 12 may be either tightly or loosely wrapped around the tubular member 10, although in the preferred embodiment, the screen will be slightly spaced, at least in part, from the underlying plastic pipe.

Once the piping thus formed is installed in a system, the screen wrapping 12 will substantially insulate the tubular member 10 from fire which may develop in an area to be protected. In those instances where thermal deterioration of the tubular member does occur, it will usually be in the form of small pin holes which permit water to leak from the tubular member onto the screen whereby it cools the screen and prevents further transfer of heat to the pipe. In those instances where a larger hole occurs in the pipe, the screen will deflect the water so that a fine spray occurs which helps to extinguish the fire.

The invention may be embodied in other specific forms without departing from the spirit or the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Piping for use in fire protection systems, said piping comprising a plastic tubular member, and a woven wire screening material covering said tubular member at least partially in a spaced relationship therewith so as to at least partially insulate said piping from fire and heat deterioration thereby limiting any failure of the tubular member to small pin holes which permit water in the system to escape therethrough, dripping onto the screening material to cool it and prevent further transfer of heat to the tubular member.

2. The plastic piping as defined in claim 1 wherein said tubular member is formed of polyvinylchloride.

3. The plastic piping as defined in claim 2 wherein said screening material is a woven wire screen of between 10–20 gauge.

4. The plastic piping as defined in claim 3 wherein said wire screen is aluminum mesh.

* * * * *